J. B. LIVINGSTON.
INSPECTION AND MIXING VALVE.
APPLICATION FILED JUNE 20, 1910.
999,575.
Patented Aug. 1, 1911.
2 SHEETS—SHEET 1.
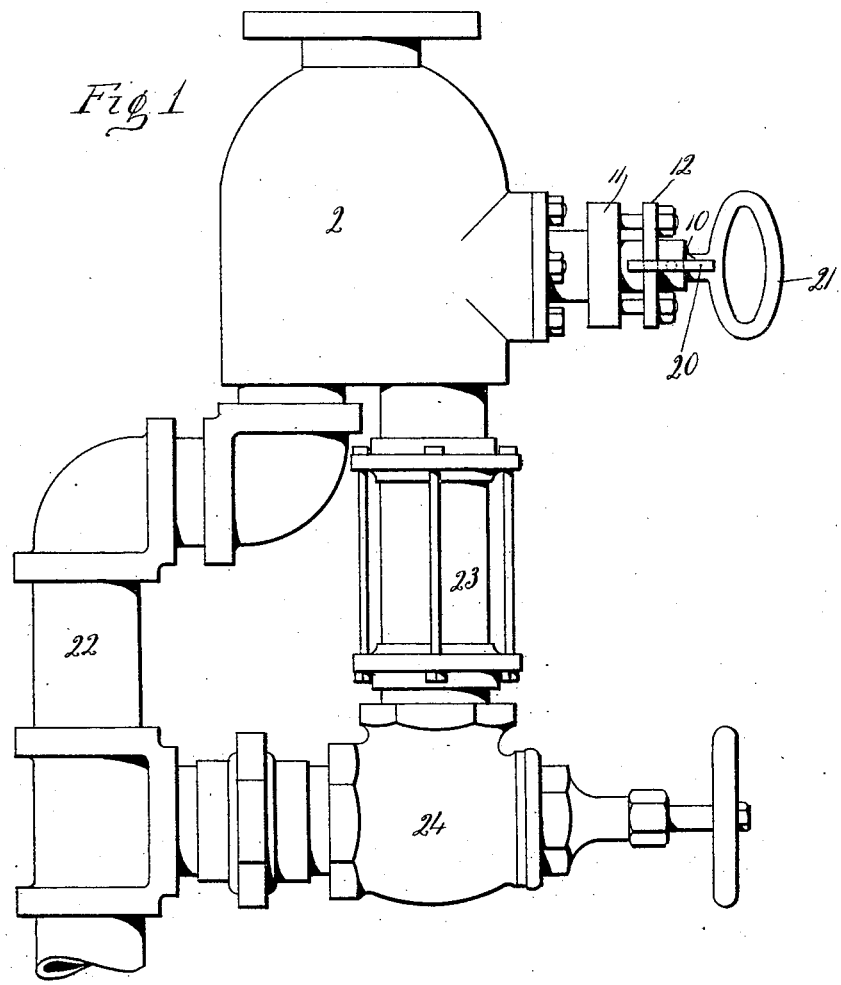

J. B. LIVINGSTON.
INSPECTION AND MIXING VALVE.
APPLICATION FILED JUNE 20, 1910.
999,575.
Patented Aug. 1, 1911.
2 SHEETS—SHEET 2.
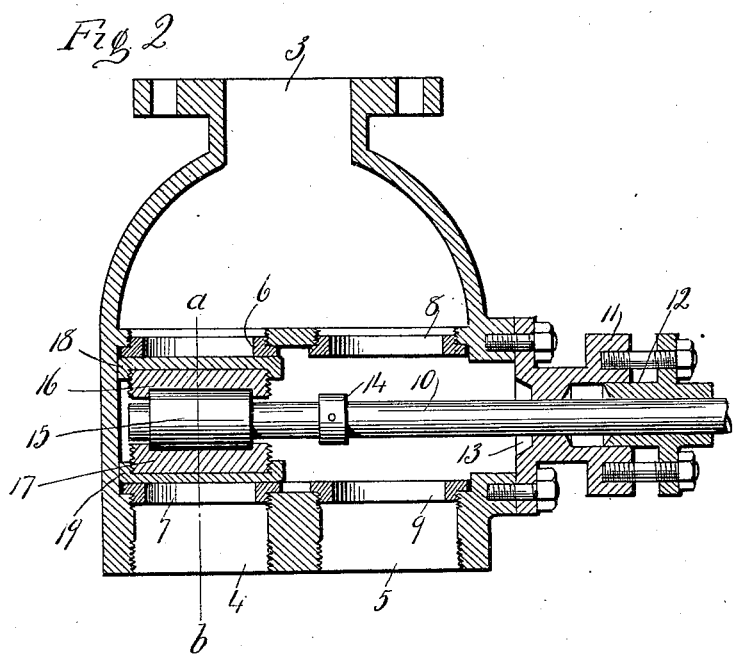
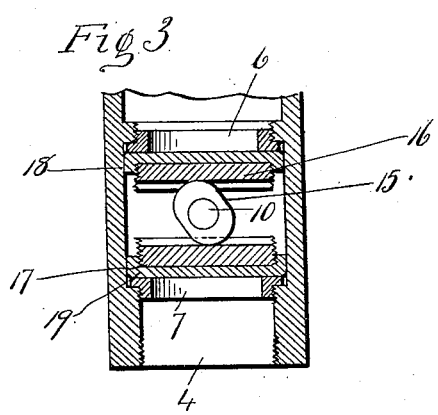

UNITED STATES PATENT OFFICE.

JOHN B. LIVINGSTON, OF NEW HAVEN, CONNECTICUT.

INSPECTION AND MIXING VALVE.

999,575. Specification of Letters Patent. Patented Aug. 1, 1911.

Application filed June 20, 1910. Serial No. 567,930.

*To all whom it may concern:*

Be it known that I, JOHN B. LIVINGSTON, a citizen of the United States, residing at New Haven, in the county of New Haven and State of Connecticut, have invented a new and useful Improvement in Inspection and Mixing Valves; and I do hereby declare the following, when taken in connection with the accompanying drawings and the letters of reference marked thereon, to be a full, clear, and exact description of the same, and which said drawings constitute part of this specification, and represent, in—

Figure 1 a side view of an inspection and mixing valve constructed in accordance with my invention. Fig. 2 a sectional view through the upper portion or valve proper. Fig. 3 a sectional view on the line $a$—$b$ of Fig. 2.

This invention relates to an improvement in inspection and mixing valves, the object being to provide a mixing and inspecting valve whereby material passing through the valve may be examined without exposing the material passing through the valve to the atmosphere.

In handling any volatile material, such, for instance, as naphtha, in a grease-extracting plant or other plant in which the volatile substance is employed, it is desirable to examine the condition of the substance passing through the valve so as to determine the condition of the solvent, and the object of this invention is to provide a valve by which material passing through it may be thoroughly mixed and a portion of it disclosed for inspection; and the invention consists in the construction hereinafter described and particularly recited in the claims.

In carrying out my invention, I employ a hood or dome-like valve chamber 2 having an inlet 3 at the top and two outlet passages 4, 5, at the bottom. At the top of the passage 4 is a valve seat 6 and at the bottom a corresponding valve seat 7, and in the passage 5 are corresponding upper valve seat 8 and lower valve seat 9. Entering through one side of the casing is a valve stem 10 passing through stuffing boxes 11 and 12 of usual construction except that the stuffing box 11 will have in its inner face a recess 13 to receive a collar 14 on the stem 10. The inner end of the stem is formed with an elliptical cam 15 which engages with disks 16 and 17 carrying brass rings 18 and 19 which are crowned to fit against the seats 6 and 7 or 8 and 9 so as to close either of the passages 4 and 5. The passage 5 is normally closed, but to open the passage 5 and close the passage 4 the stem 10 is given a quarter turn so as to turn the cam 15 and allow the rings 18 and 19 to be relieved from frictional engagement with the seats 8 and 9 and so that by inward movement of the stem the rings 18 and 19 will be carried into line with the seats 6 and 7 and so as to close the opening 4 when the stem is again turned. Provision may be made for holding the valve stem in the position so that the cam 15 will hold the rings firmly against the seat. As an illustration of such means I show a set screw 20 engaging with the valve stem 10. The passage 4 leads through pipes 22 to any desired tank or other device, while the passage 5 leads to a glass inspection tube 23 which opens at the bottom through a valve 24 into the pipe 22. In normal condition and when the valve is open the material entering the inlet 3 will escape through the passage 4, the passage 5 being at this time closed. When it is desired to inspect the contents passing through the valve, the stem will be turned and moved inward so as to close the passage 4. The material entering the valve is then deflected by the closed passage 4 and the dome-like chamber 2 forms a deflecting chamber in which the water and naphtha or other materials will be mingled and pass through the opening 5 into the inspection glass 23, the valve 24 being closed. As soon as the inspection glass 23 is filled, the stem 10 will be pulled outward so as to again open the passage 4. After the material in the glass is inspected the valve 24 is opened and the material allowed to escape into the pipe 22. I am thus enabled to inspect the material passing through the valve without exposing it to the atmosphere so that possible danger of ignition or explosion is avoided.

I claim:—

1. An inspection and mixing valve comprising a dome-like chamber, an inlet at the top and two outlets at the bottom, valve seats in said outlets, a horizontally arranged valve stem, and a valve carried thereby and adapted to close either of the outlet openings.

2. An inspection and mixing valve comprising a casing having an inlet and two outlets, a discharge pipe opening from one of said outlets, a glass inspection tube connected at one end with the other outlet and at the opposite end through a valve with said discharge pipe, and a valve adapted to be moved to close either one of said outlets.

3. An inspection and mixing valve comprising a dome-like valve chamber, an inlet at the top thereof and two outlets at the lower end thereof, a horizontally movable valve stem, an elliptical cam on said stem, and means operated thereby for closing either one of the outlets.

In testimony whereof, I have signed this specification in the presence of two subscribing witnesses.

JOHN B. LIVINGSTON.

Witnesses:
FREDERIC C. EARLE,
CLIFFORD J. REED.

Copies of this patent may be obtained for five cents each, by addressing the "Commissioner of Patents, Washington, D. C."